Feb. 3, 1959  H. D. MARKWELL  2,871,896
VENEER SCARFING MACHINE
Filed Feb. 18, 1957  2 Sheets-Sheet 1

INVENTOR.
HARRY D. MARKWELL
BY
ATTORNEYS

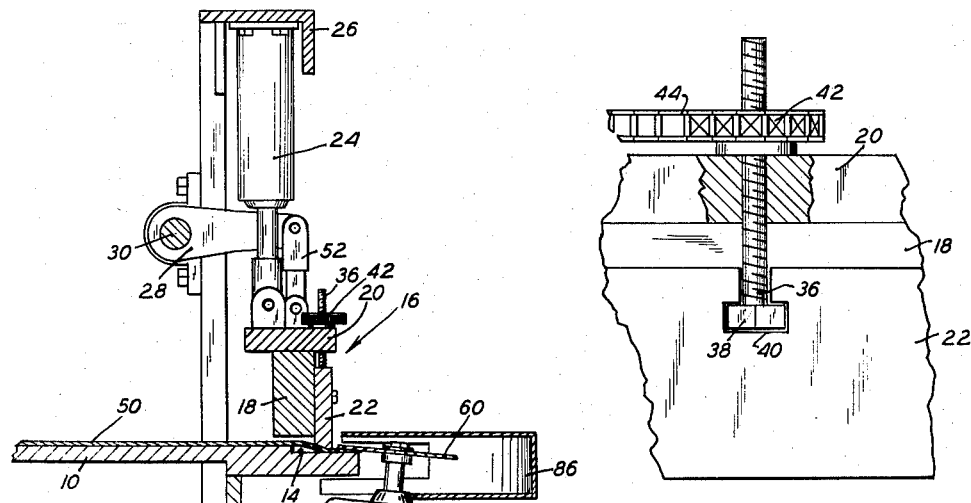
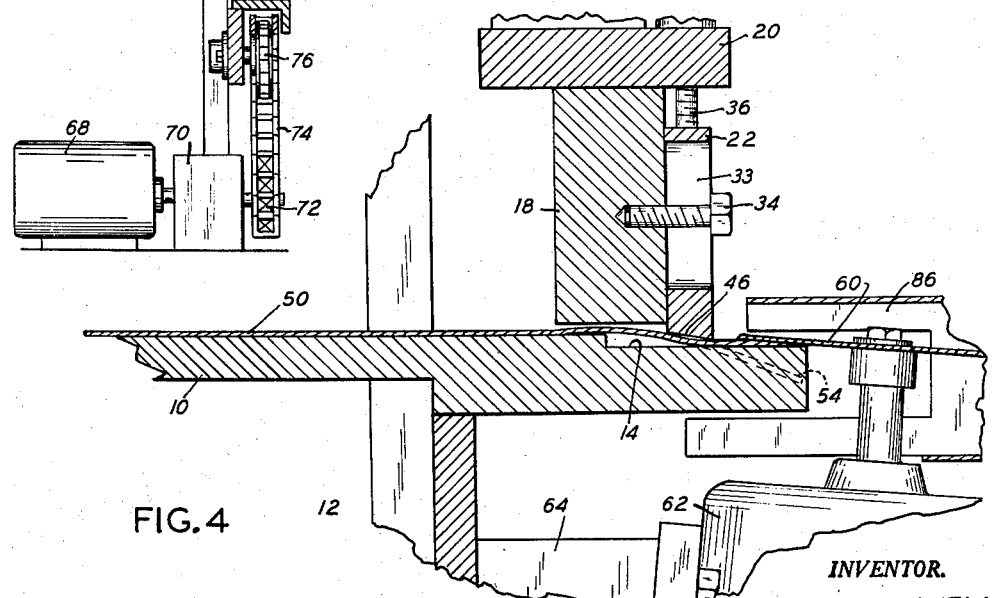

United States Patent Office 2,871,896
Patented Feb. 3, 1959

2,871,896

VENEER SCARFING MACHINE

Harry D. Markwell, Aberdeen, Wash., assignor to Harbor Plywood Corporation, Aberdeen, Wash., a corporation of Delaware Application February 18, 1957, Serial No. 640,968

5 Claims. (Cl. 144—309)

The present invention relates to a method and a machine for scarfing wood veneers, and more particularly to methods and apparatus for clamping thin, flexible material so that work operations may be performed on such material.

The standard plywood panel produced today is four feet wide by eight feet in length, but occasionally there arises a need for a panel of greater length. On occasions this demand is met by scarfing and gluing together finished panels, but in some instances, particularly where the desired increase is less than a panel length, this is not a desirable practice. For many purposes a better panel can be produced by scarfing the veneer pieces which run lengthwise of the panel and gluing the scarfed joints together, so as to make elongate, longitudinally grained veneer sheets. Heretofore, considerable difficulty has been encountered in forming a scarf on the veneers because of the thinness and flexibility of the veneer sheets, and, as will be obvious, the scarfs must be accurately formed with smooth surfaces so as to enable the formation of a good glue bond between the scarfed veneers.

It is an object of the present invention, therefore, to provide a new and improved apparatus for scarfing plywood veneers.

A particular object of the invention is to provide a new and improved machine to permit a smooth and accurate scarf to be sawed on a plywood veneer.

A more general object of the invention is to provide apparatus that may be used for clamping resilient material so that work may be performed upon such material.

A further object is to provide a new and improved method of securing resilient material in a stable position.

Other objects and advantages of the invention will become more apparent hereinafter.

In accordance with the illustrated embodiment of the invention, a resilient member, such as a wood veneer, is clamped by positioning the member with the portion thereof, such as an edge, to be held stable, positioned against a work bed. Force is then applied to the member at a point adjacent such portion and in an amount greater than necessary to deflect the member into contact with the work bed, whereby the resiliency of the member causes said portion firmly to press against the work bed. Work, such as scarfing, can then be performed upon the exposed part of the member portion.

For a more detailed description of the invention, reference is made to the accompanying specification and drawings, wherein:

Fig. 3 is a cross sectional view taken substantially along line 3—3 of Fig. 2;

Fig. 4 is an enlarged view of a portion of the section shown in Fig. 3, showing further details of the method and apparatus of the invention; and Fig. 5 is a fragmentary elevational view, partly in section, of a portion of the apparatus of the invention.

Figure 2:
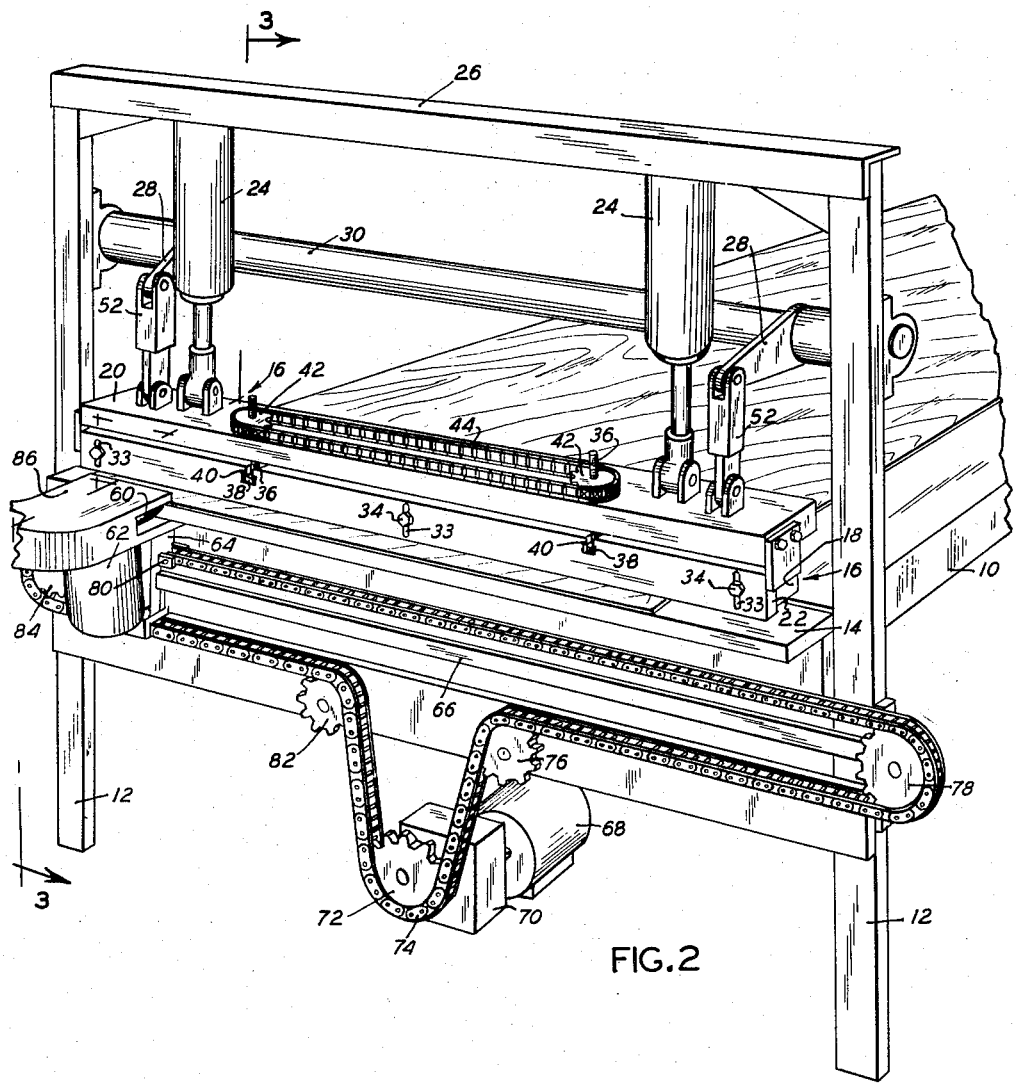
Fig. 2 is a fragmentary, perspective view of apparatus made in accordance with the invention.

Referring to the drawings, the invention is illustrated in connection with a machine for scarfing plywood veneers including a generally flat table 10 upon which the veneer to be scarfed is supported. The table may be supported by suitable means such as standards 12. One end of the table 10 is formed with a downwardly stepped work bed 14 over which is reciprocally mounted a clamping head 16 extending transversely of the table. The clamping head 16 includes a body member 18 to which is secured a top plate 20 and a face piece or clamping plate 22. The clamping head is raised and lowered by means of a pair of cylinders 24 connected through a suitable control system (not shown) to a source of pressure fluid in a conventional manner. The cylinders 24 are suitably secured to a cross bar 26 extending between the standards 12. The movement of the clamping head 16 is stabilized by means of a pair of rocker arms 28 mounted on a shaft 30, suitably journaled on the standards 12, the rocker arms being connected to the top plate 20 by means of connecting links 52.

Preferably, the clamping plate is adjustable vertically of the body member 18. As best shown in Figs. 2 and 4, the clamping plate 22 is formed with three vertical slots 33 through which project the shanks of bolts 34 threaded into tapped openings in the body member 18, whereby the bolts may be tightened to clamp the plate 22 relative to the member 18. Means are provided to assist in the adjustment of the position of the clamping plate 22, comprising in this instance a pair of vertical screws 36 having heads 38 engaged in T-slots 40 formed in the clamping plate 22, the screws being threaded upwardly through the top plate 20. Each of the screws 36 has a sprocket 42 secured thereto, the sprockets being interconnected by a chain 44 which may be manipulated to obtain simultaneous adjustment of the screws 36. As best shown in Fig. 4, the lower edge 46 of the clamping plate 22 is beveled upwardly in the direction away from the free edge of the work bed 14 for a purpose to be explained.

As best shown in Figs. 3 and 4, the piece of material to be worked upon, such as a sheet of wood veneer 50, is positioned on the table 10 with the edge portion of the sheet upon which the work is to be performed positioned over the work bed 14. The clamping head 16 is then lowered to cause the clamping plate 22 to engage the sheet 50 and press the portion beneath the clamping plate against the work bed 14. Preferably, the clamping plate 22 is so located as to engage the sheet 50 substantially medially of the work bed 14 between the free edge thereof and the step of the table which define the bed. Preferably, also, the position of the clamping plate 22 is adjusted on the body member 18 so that in its depressed position the clamping plate firmly presses the sheet 50 against the work bed 14 but does not exert on the sheet excessive compressive force which, such as in the case of wood veneer, might crush the sheet and mar the appearance thereof.

The relative position of the lowermost edge of the clamping plat 22 is preferably such that when the clamping head is in its clamping position, the body member 18 is spaced above the surface of the table 10 by a distance substantially greater than the thickness of the sheet 50. This space and the beveled configuration of the lower end 46 of the clamping plate 22 permits the sheet of material to arch, as best shown in Fig. 4, in gentle curves so that no abrupt bends are formed in the sheet and which might cause breakage.

It will be noted that lowering of the clamping head 16 causes the sheet 50 to bend downwardly from the plane of the table 10 so that the normal plane or contour of the edge portion of the sheet would intercept the work bed 14, as indicated at 54 in Fig. 4. As will be apparent, the resiliency of the sheet and its tendency to assume a flattened configuration will cause the portion thereof projecting beyond the clamping plate 22 to snugly press against the surface of the work bed 14 so that work may be performed upon that portion of the sheet.

Figure 1:
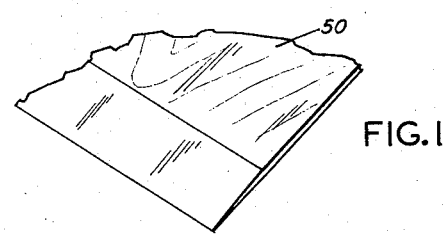
Fig. 1 is a fragmentary, perspective view of a wood veneer showing how a scarf is formed thereon in accordance with the apparatus of the invention.

In the illustrated embodiment of the invention, a scarfing saw is mounted adjacent the work bed 14 so as to cut a scarf on the end of the sheet similar to that shown in Fig. 1. The saw includes a circular blade 60 which may be directly secured to the armature shaft of a motor 62. The motor is mounted for reciprocation along the edge of the work bed 14 with the saw blade 60 positioned to saw a scarf at the desired angle on the veneer sheet 50, as most clearly shown in Figs. 3 and 4. In the embodiment shown, the motor 62 is secured to a guide block 64 suitably secured to a slide 66 extending transversely of the table. The scarfing saw is reciprocated by suitable means such as a reversible electric motor 68 mounted beneath the table 10 and connected to the input shaft of a gear box 70, to the output shaft of which is secured a sprocket 72. Trained over the sprocket 72 is a chain 74, one side of which runs over sprockets 76, 78 suitably journaled on the frame of the table, the end of the chain being secured to one side of the guide block 64 at 80. The opposite side of the chain leads over sprockets 82, 84 and is suitably secured to the opposite side of the guide block 64, a shield 86 preferably being placed about the blade 60. A suitable control arrangement, not shown, is provided to control movement of the saw along the edge of the table when the veneer is to be scarfed. With a veneer sheet clamped in the manner shown, a smooth and accurately formed scarf may be formed on a veneer sheet. Obviously, other types of work can be performed on other resilient materials similarly clamped.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A machine for performing work upon the edge portion of a thin, flexible member having an inherent tendency to remain flat, said machine comprising a horizontal table having a downwardly stepped work bed at one end thereof and parallel to said table for supporting an edge portion of a member to be worked when said member portion has been bent downwardly, a clamping plate extending transversely of said work bed, said clamping plate being positioned substantially medially of and above said work bed, the surface of said clamping plate facing said work bed being beveled upwardly from said work bed in the direction toward said table, and means for bringing said clamping plate into engagement with a member positioned therebeneath and on the work bed and pressing the edges of the engaged portion of the member firmly against said work bed.

2. A machine for firmly clamping the edge portion of a normally flat, resilient sheet to enable work to be performed upon said edge portion, said machine comprising a horizontal table, a work bed at one end of said table spaced below and substantially parallel to the plane of the table, a clamping head including a body member mounted above said work bed, means for raising and lowering said body member between predetermined positions, said clamping head including a clamping plate for engaging the intermediate part of the portion of a sheet positioned over said work bed, and means adjustably securing said clamping plate to said body member.

3. In a machine for scarfing a normally flat, thin, flexible sheet of wood veneer comprising a flat horizontal table for supporting such a sheet, the edge portion of said table adjacent one end thereof being stepped downwardly beneath and substantially parallel to the plane of the remainder of said table to define a work bed, a releasable clamping member mounted above said work bed positioned to engage the top of a sheet on said table substantially medially of said work bed and to clamp the edge of the portion of the sheet therebeneath against said bed, and cutting means mounted adjacent said work bed for engaging the exposed surface of a sheet clamped on said work bed and cutting a scarf on said sheet.

4. A machine for scarfing a thin sheet of wood veneer comprising a flat horizontal table for supporting such a sheet, the edge portion of said table adjacent one end thereof being stepped downwardly beneath and substantially parallel to the plane of the remainder of said table to define a work bed, a releasable clamping member mounted above said work bed positioned to engage the top of a sheet on said table substantially medially of said work bed and to clamp the edge of the sheet against said bed, a circular saw mounted adjacent said work bed, and means for moving said saw along the edge of said work bed with the saw positioned to intercept and cut a scarf on the edge portion of a sheet clamped upon the work bed.

5. The method of clamping an edge portion of predetermined width of a normally flat, resilient sheet member against a fixed, planar body which comprises positioning said member such that in the normal condition of said member said edge portion is adjacent and substantially parallel to but spaced from said fixed, planar body, and, while otherwise retaining said member in position, applying a force upon an intermediate portion of said member between said edge portion and the main part of said member to deflect said edge portion toward said fixed body and cause the plane of said intermediate portion to intercept said body, and deflecting said edge portion by an amount sufficient to bring the entire width of said edge portion into engagement with said fixed body thus to cause said edge portion to forcefully engage said fixed body by reason of the tendency of said edge portion to assume a coplanar position relative to the deflected said intermediate portion.

References Cited in the file of this patent

UNITED STATES PATENTS

| | | |
|---|---|---|
| 227,876 | Blain | May 25, 1880 |
| 247,242 | Clancy | Sept. 20, 1881 |
| 1,141,253 | Merrick | June 1, 1915 |
| 1,326,350 | La Bate | Dec. 30, 1919 |
| 1,644,961 | Suttis et al. | Oct. 11, 1927 |
| 2,314,049 | Leino | Mar. 16, 1943 |
| 2,570,926 | Elmendorf | Oct. 9, 1951 |
| 2,571,603 | Payzant | Oct. 16, 1951 |
| 2,652,077 | Alexander | Sept. 15, 1953 |
| 2,719,551 | Baldwin et al. | Oct. 4, 1955 |

FOREIGN PATENTS

| | | |
|---|---|---|
| 727,148 | Germany | Oct. 28, 1942 |